Aug. 17, 1971 L. E. HIBBS, JR 3,600,221

ZINC DIFFUSED COPPER

Filed Feb. 6, 1969 2 Sheets-Sheet 1

INVENTOR:
LOUIS E. HIBBS JR., by Jane M. Binkowski
HIS ATTORNEY

Aug. 17, 1971 L. E. HIBBS, JR 3,600,221

ZINC DIFFUSED COPPER

Filed Feb. 6, 1969 2 Sheets-Sheet 2

INVENTOR:
LOUIS E. HIBBS, Jr.,
by Jane M. Binkowski
HIS ATTORNEY

United States Patent Office
3,600,221
Patented Aug. 17, 1971

3,600,221

ZINC DIFFUSED COPPER

Louis E. Hibbs, Jr., Schenectady, N.Y., assignor to General Electric Company

Continuation-in-part of application Ser. No. 720,201, Apr. 10, 1968. This application Feb. 6, 1969, Ser. No. 797,201
Int. Cl. B44d 1/18
U.S. Cl. 117—217 23 Claims

ABSTRACT OF THE DISCLOSURE

The surface of a copper body which may, for example, be a coating, foil or wire, is provided with a zinc coating. The zinc coating is diffused into the copper surface to form an alloy surface zone which protects and preserves the properties of materials such as polymers and carbon that ordinarily degrade when contacted with copper.

This application is a continuation-in-part of U.S. application Ser. No. 720,201 filed Apr. 10, 1968, now abandoned and assigned to the same assignee.

The present invention relates generally to the preparation and use of copper bodies and is particularly concerned with novel polymer-coated copper bodies, and with a new method for the production of these bodies.

Polymers in the form of coatings on metal surfaces are useful as insulation. A number of polymers coated on copper surfaces, however, degrade rapidly in air, especially at elevated temperatures. This is a serious disadvantage when the polymers are used as electrical insulation for copper wire where one of the most important requirements is high temperature stability of physical properties. For example, when a heat-resistant polyimide is coated on copper wire and heat aged at 300° C. in air, it will degrade sufficiently in 2 to 3 hours to fail a standard flexibility test. However, when the same polyimide is coated on a comparatively inert substrate such as aluminum, or tested as a free film, the thermal life of the polymer is as much as 100 times longer. In addition, when the polyimide on a copper substrate is heat aged in an atmosphere containing no oxygen, rapid degradation of the physical properties does not take place. It is generally believed, therefore, that copper acts as a catalyst for the oxidative degradation of the polymer insulation.

To prevent such degradation by copper, it has consequently been proposed to provide a barrier layer of an inert material such as aluminum between the copper and the polymer insulation. There are, however, a number of inherent disadvantages in the use of a barrier layer, especially when the copper is in the form of wire. For example, an effective barrier layer must have a minimum thickness due to porosity of the barrier material, which adds weight to the wire and may effect its flexibility. During high temperature operation, an excess amount of the barrier material may diffuse into the copper wire and drop its electrical conductivity significantly. In addition, the barrier material may not adhere properly to the copper surface, and likewise, the polymer insulation may not adhere satisfactorily to the surface of the barrier material.

According to the present invention, the foregoing shortcomings of the prior art are all avoided and the degradation of polymer insulation on copper is prevented without the use of an intermediate layer of barrier material. Thus a classic problem in the art has been solved and the way has been opened to the general use of a number of desirable insulating materials on copper wires and other articles in elevated temperature environments.

Briefly stated, in its method aspect one embodiment of the present invention comprises forming a thin film of zinc on the surface of a copper body before the polymer coating is applied, and then diffusing the zinc into the copper surface to form an alloy surface zone which inhibits or prevents degradation of the polymer insulation, especially at elevated temperature.

The present invention, together with further objects and advantages thereof, will be better understood from the following description taken in connection with the accompanying drawings and its scope will be pointed out in the appended claims, in which;

Figure 1:
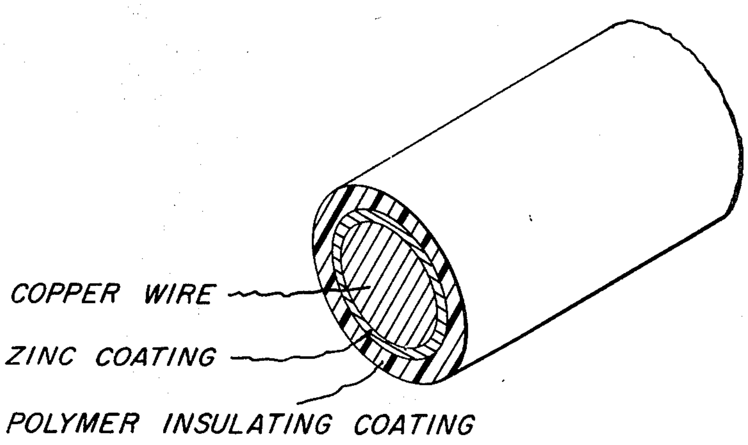
FIG. 1 is a cross-section of a copper wire enveloped with a thin zinc film and polymer insulating coating.

In its product aspect, the present invention comprises a copper body having a zinc-diffused surface zone, the surface of said zone being a brass containing substantially no free copper and no free zinc.

In accordance with this invention, the copper may have any desired form although for most applications, it will be in the form of wire or cable. It may, however, be in the form of a foil, coating, tape, or machine parts because the new results and advantages of this invention are not dependent upon the shape or the size of the copper body used. But the copper surface should be clean so that a continuous adherent zinc film can be deposited on it. Any conventional cleaning technique can be used. For example, copper wire to be used as an electrical conductor ordinarily requires a number of cleaning steps. Thus it may be conducted through an organic solvent for degreasing, rinsed with water, passed through acid to remove oxide scale and again rinsed with water.

In carrying out the process of the present invention, the zinc film is deposited on the clean copper surface by any conventional method. For example, the zinc film can be electrodeposited, i.e. electroplated from solution on the copper surface. It may also be vacuum deposited from an electron-heated source or a resistance-heated source.

The zinc film should be of at least a film-forming thickness, i.e. about one microinch, and should be substantially continuous over the copper surface. A zinc film less than one microinch thick would be substantially discontinuous and generally give poor results because of exposed copper. Films ranging from about 2 to 10 microinches are preferred because of the desirable results produced by such a small amount of zinc. In the present process, the zinc films can be thicker than 10 microinches and as thick as about 50 microinches, but these thicker films offer no additional advantage. Films in excess of 50 microinches produce some of the problems of a barrier layer. They are also undesirable because of their slower rate of diffusion since zinc diffused into the copper surface impedes the diffusion of additional zinc.

The narrow range of zinc film thickness used in the present invention provides several important advantages. First it is economical of zinc and of zinc deposition and zinc diffusion time and costs. Secondly, the diffusion of substantially all of this zinc film into the copper body has no significant effect on the electrical conductivity of the copper. Finally, the zinc adds negligible weight of the final product and does not affect its flexibility.

The zinc diffusion is carried out at temperatures and under conditions which do not cause any significant vaporization of the zinc. Generally, the zinc diffusion can be carried out at a temperature in the range of about 150° C. up to about the melting point of the zinc. Temperatures lower than 150° C. diffuse the zinc at a rate too slow for practical application. On the other hand, temperatures at the melting point of zinc, or higher, vaporize the zinc and prevent proper diffusion. The time required to diffuse the zinc coating into the copper surface depends on the thickness of the zinc coating and the temperature of diffusion. For example, for a copper wire having a coating of zinc which is 10 microinches or less in thickness, a temperature of 275° C. will diffuse the zinc completely in about two minutes or less.

Substantially all of the zinc is diffused into the copper. Should any significant amount of free zinc be left on the surface under conditions conducive to the oxidation of the zinc, the adherence of the polymer coat would be impaired because of the friable nature of zinc oxide.

The completion of the zinc diffusion is determinable empirically. The zinc is diffused until substantially all of its silvery gray color disappears. When the diffusion is completed, the zinc-diffused copper surface exhibits a gold color of brass.

The zinc film can be diffused into the copper at any desired time in the preparation of the insulated copper product. In the preparation process, however, the deposited zinc film should not be exposed to temperatures which would cause it to vaporize significantly. It can be diffused into the copper in any desired manner, as for example, in air or in an inert atmosphere.

In the case of copper wire, which is generally annealed before it is provided with the polymer insulation, the instant process can be carried out in a number of ways. For example, the zinc film can be deposited and diffused into the wire before annealing. The zinc film can also be deposited on the wire before annealing and diffused into the wire during the annealing procedure. In addition, the copper wire can be annealed before the zinc is deposited and diffused.

The diffusion of the zinc coating during the annealing procedure is preferred because it can be carried out in a single step. Since in the annealing process the copper wire is heated progressively to annealing temperature, the zinc coating is diffused into the copper before annealing temperature is reached. Although the annealing temperature of copper wire is higher than the melting point of the zinc, the exposure of the zinc-copper alloy surface zone to such temperature in the annealing process is for a short period of time and does not result in any significant vaporization of the diffused zinc.

The deposited zinc coating can also be diffused into the copper wire after the coating of polymer is applied. In this technique, the zinc can be diffused into the copper while the polymer coating is being dried, cross-linked or otherwise treated.

Figure 2:
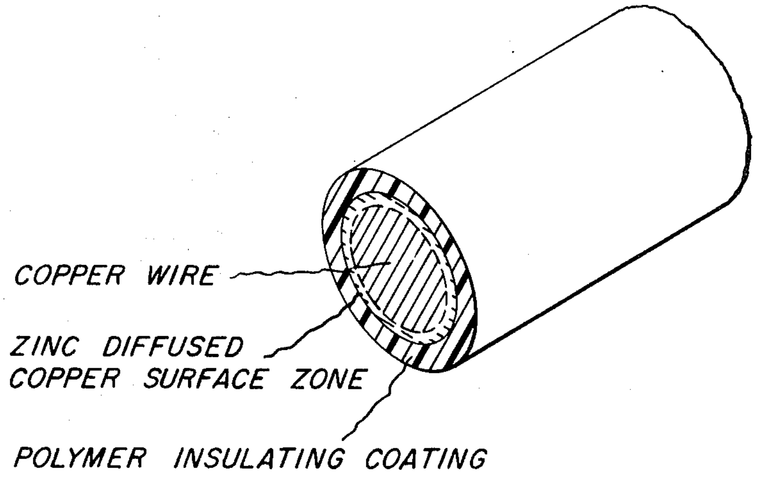
FIG. 2 shows the FIG. 1 wire with the zinc diffused into the copper surface to provide an alloy surface zone.

FIG. 1 shows the copper wire after it had been coated with zinc and polymer and FIG. 2 illustrates the zinc diffused copper surface zone formed by heating the coated copper wire of FIG. 1.

The polymer insulation employed in combination with the zinc-treated copper body can vary widely and may take the form of both thermoplastic and thermosetting polymers. One particular useful insulating polymer comprises the reaction product of (1) a lower dialkyl ester of a member selected from the class consisting of terephthalic acid and isophthalic acid and mixtures of said members, (2) ethylene glycol, and (3) a saturated aliphatic polyhydric alcohol having at least three hydroxy groups. Examples of the saturated aliphatic polyhydric alcohol include glycerin, pentaerythritol, 1,1,1-trimethylol propane, tris-(2-hydroxyethyl) isocyanurate etc. These ingredients are employed advantageously in the range of (1) from about 25 to 56 equivalent percent of a lower dialkyl ester of a member selected from the class consisting of terephthalic acid and isophthalic acid and mixtures of said mixtures of said members, (2) from about 15 to 46 equivalent percent of ethylene glycol, and (3) from about 13 to 44 equivalent percent of the saturated aliphatic polyhydric alcohol having at least three hydroxyl groups, the sum of the equivalent percents of (1), (2), (3) being equal to 100 equivalent percent. The terephthalic and isophthalic acids may be used in place of the dialkyl ester. The above described compositions are more particularly disclosed in U.S. Pats. 2,936,296 issued May 10, 1960 and 3,342,780 issued Sept. 19, 1967.

Another class of insulating compositions comprise polyamide acids which are the reaction products of a tetracarboxylic acid or dianhydride and an organic diamine. These polyamide acids can be heated at elevated temperatures to convert them to the substantially insoluble and infusible state by ring closure forming polyimide resins. Among the polycarboxylic dianhydrides that may be employed for these purposes are 3,3′,4,4′-benzophenonetetracarboxylic acid dianhydride, pyromellitic dianhydride; 2,3,6,7-naphthalene tetracarboxylic dianhydride; 3,3′,4,4′-diphenyl tetracarboxylic dianhydride; 2,2-bis (3,4-dicarboxyphenyl) propane dianhydride; 3,4-dicarboxyphenyl sulfone dianhydride, etc. Among the organic diamines which may be employed are, for instance, metaphenylene diamine; para-phenylene diamine; 4,4′-diamino diphenyl propane; 4,4′-diamino diphenyl methane; benzidine; hexamethylene diamine, etc. The compositions described above and methods for preparing the same are more particularly described in U.S. Pats. 3,179,614, 3,179,633 and 3,179,634 all issued Apr. 20, 1965. Polymers of this class wherein the dianhydride used for the purpose is a benzophenone tetracarboxylic acid dianhydride are more particularly described in U.S. Pat. 3,277,043 issued Oct. 4, 1966.

Another class of polymeric compositions which can be advantageously employed for insulating purposes comprises organopolysiloxaneimides obtained by reacting a tetracarboxylic acid or anhydride, many examples of which have been given above, with a diamino-polysiloxane compound in which the amino groups are attached to silicon through the medium of a carbon atom. Such compositions are more particularly described in U.S. Pat. 3,325,450 issued June 13, 1967. Additional examples of such compositions useful for insulating purposes are found in the copending applications of Fred F. Holub, Ser. Nos. 638,633, now Pat. No. 3,392,143; 638,634, now Pat. No. 3,392,144 and 638,579, all filed May 15, 1967 and assigned to the same assignee as the present invention.

Other polymeric compositions may be employed for insulation purposes including such materials as polyamides, polyamideimides, epoxy resins, polysulfone resins, phenolaldehyde modified polyvinyl acetal resins, halogenated polyethylenes, polycarbonate resins, polyvinyl chloride, organo-polysiloxanes, alkyd-modified polyorganopolysiloxane resins, etc. Representative of these polymers is the polycarbonate resin formed from 2,2-bis(4-hydroxyphenyl) propane (bisphenol A) and phosgene; polytrifluoromonochloroethylene and polyvinyl formal. Mixtures of such polymers may also be used. Many of such compositions are found described in U.S. Pats. 2,258,218–2,258,222 issued Oct. 7, 1941; 2,449,572 issued Sept. 21, 1948; 2,307,588 to Hall and Jackson; 2,587,295; and 2,997,459 issued Aug. 22, 1961; U.S. 3,264,536 issued Aug. 2, 1966, Great Britain Pat. 1,082,181 and Netherlands Pat. 6,478,130. By reference, all the above mentioned patents and patent applications are incorporated in the present application. The particular polymer or copolymer used as insulation in the present invention depends largely on the required properties of the final product. For example, polyimides have excellent dimensional stability at high temperatures, i.e. about 180° C. or higher, and are particularly satisfactory for use at these temperatures.

The polymer insulating coating can be formed by any conventional technique. The coating may be applied over the zinc plated copper surface or the zinc diffused copper surface. The polymer can be in liquid or melt form. For example, in liquid form the polymer can be a solution, dispersion or emulsion. In such case, a continuous adherent film is generally formed by evaporation of solvents or by heat. The polymer can also be electrocoated onto the zinc-treated copper surface by contacting such surface with a polymer solution and subjecting the solution to electrolysis making the zinc-treated copper an electrode whereby the polymer deposits on its surface. For example, polyamide acid resins can be electrocoated in the manner described in the copending application of Fred F. Holub, Ser. No. 548,000, now Pat. No. 3,507,765, filed May 5, 1966 and assigned to the assignee hereof. In melt form, the polymer coating can be formed by extrusion. The properties of the polymers can be modified by the addition of conventional components such as plasticizers, pigments, dyes, and crosslinking agents.

If desired, the products of the present invention may be treated by conventional techniques to further improve their properties. For example, in the electrical conductor art, a number of polymers used to insulate copper wire have poor abrasion resistance. To overcome this deficiency one can employ a combination of polymers wherein a coating of a polymer which provides abrasion resistance is used in addition to the coating of insulating polymer, or two polymers are used which produce a synergistic effect of improved properties. For example, a coating of a polyamide acid such as the condensation product of pyromellitic dianhydride with 4,4′-oxydianiline can be initially applied followed by an insulating coating of a polyester such as that disclosed in U.S. Pat. 2,936,296. During cure, the polyamide acid is converted to the polyimide which provides the polyester insulating coating with improved abrasion resistance.

In order that those skilled in the art may better understand how the present invention may be practiced, the following examples are given by way of illustration and not by way of limitation. All parts and percentages used herein are by weight unless otherwise noted.

The invention is further illustrated in the following examples where tests and conditions were as follows unless otherwise noted:

The copper wire had a 0.050 inch diameter.

All copper wire was cleaned before deposition of any coating by immersion in acetone for about 10 seconds to degrease it, then immersion in an acid cleaning solution for about 10 seconds, followed by a rinsing with tap water and then distilled water. The acid solution was formulated to clean the copper without roughening its surface. It was comprised of 512 ml. sulfuric acid, 256 ml. nitric acid, 64 ml. water and 1 ml. hydrochloric acid.

Zinc was electroplated on copper wire using an electroplating solution comprised of 105.0 g. of sodium cyanide, 56.2 g. zinc oxide, 55.5 g. sodium hydroxide and sufficient water to make one liter of solution. This solution was used at room temperature with anodes which were pure zinc.

The thickness of a zinc film was determined by the time required to deposit it. Specifically, the time necessary to deposit a given thickness of zinc by electroplating was calculated in the following manner:

T=thickness of the zinc film desired (cm.)
A=surface area to be coated (sq. cm.)[1]
$a$=current used for the electrodeposition of zinc (milliamps.)
$d$=density of the electrodeposited zinc (7.13 grams/cubic cm.)
E=Electrochemical Equivalent of zinc (based on 100% cathode current efficiency which was justifiable with the electrodeposition conditions used) ($E=0.203\times10^4$ gram/milli-amps.-sec.)
$t$=time (in seconds) to deposit zinc of thickness T.

$$t=\frac{dTA}{aE}$$

[1] For the case of a cylindrical substrate (such as round copper wire) $A=\pi DL$, where:

D is the substrate diameter (in centimeters)
L is the length being coated (in centimeters).

The cathode efficiency was essentially 100% if the cathode current density was not greater than 30 amperes per square foot. The best plating range was 15–30 amperes per square foot.

Control samples were samples in which the polymer was coated on the clean bare copper wire.

EXAMPLE 1

In this example, the thickness of the deposited zinc coating was varied by varying the deposition time. More particularly a coating of zinc was electroplated on samples of the copper wire to thicknesses of 2 microinches, 5 microinches, and 10 microinches of zinc, respectively. All the zinc coated samples were heated in an oven in air for two minutes at 275° C. At the end of this time, they were removed from the oven and examined for color. The entire copper surface of each sample was the gold color of brass and did not show any of the silvery gray color of zinc. This indicated that all of the zinc had diffused into the copper surface.

EXAMPLE 2

In this example, four metals were deposited on copper wire before the polymer coating was applied and their effect on the polymer was determined. In one case, a coating of zinc was electroplated on a sample of the copper wire to a thickness of 4 microinches. Other samples of the copper wire were coated with arsenic, silver and tin, respectively. These coatings were formed from solution by chemical conversion. Each coating was very thin but continuous. Thereafter, each metal coated copper wire was hand-dipped in a polyester wire enamel which comprised the reaction product of 46 equivalent percent of dimethyl terephthalate, 31 equivalent percent of ethylene glycol and 23 equivalent percent of glycerin prepared in accordance with the direction in Example 1 of U.S. Pat. 2,936,296. This wire enamel, which was used as a 17% solids solution in a solvent comprising a mixture of cresols, is sold under the trademark Alkanex® by General Electric Company.

Each hand-dipped sample was cured by heating it in an oven for two minutes at about 275° C. during which time the zinc diffused into the copper. Since the cured polymer film was translucent, the zinc-diffused copper surface was visible. The surface was a gold color of brass and did not show any of the silvery gray color of zinc. The polymer coated wire samples were allowed to cool to room temperature, hand-dipped in the polymer solution a second time and cured again in the oven for two minutes at about 275° C. The final polymer film thickness after curing ranged from about 1 to 1.5 mils. Control copper wire samples coated with polymer in the same manner as described above were also prepared.

All of the samples were tested for flexibility by heat-aging them at 300° C. in an air oven for varying lengths of time, cooling the samples to room temperature, and winding each sample on a mandrel having a diameter three times that of the wire. After one hour at 300° C., all control samples, as well as the arsenic, tin and silver coated samples failed the test, i.e. the polymer insulation on each of these wires cracked and separated from the wire. In contrast to this, the insulation on the zinc-treated wire showed no flaws and was still firmly bonded to the substrate. The same result was obtained on the zinc-treated conductors even after heat-aging for another five hours at 300° C.

EXAMPLE 3

In this example, the thickness of the deposited zinc coating was varied by varying the deposition time. A coating of zinc was electroplated on samples of the copper wire to thicknesses of 2 microinches, 5 microinches and 10 microinches, respectively, to produce four samples with each coating. The polymer solution used was comprised of a polyamide acid reaction product of 3,3′,4,4′ benzophenone tetracarboxylic acid dianhydride and m-phenylene diamine dissolved in a cresol to form a solution containing 8 percent solids. Such materials are described in U.S. Pat. 3,277,043. Each zinc-coated wire sample was hand-dipped in the polymer solution and cured by heating in air in an oven for 2 minutes at 325° C. During this curing the zinc diffused into the copper in all of the samples and the polyamide acid was converted to the polyimide form. Since the cured polymer coating was substantially clear, the zinc-diffused copper surface was visible. The surface was the gold color of brass and did not show any of the silvery gray color of free zinc. The polymer coated samples were cooled to room temperature and then hand-dipped in the polymer solution and cured in the same manner two more times to produce a total of three dip coats on each sample. The final polymer film thickness after curing ranged from about 0.5 to 0.7 mil.

Four control copper wire samples were also prepared by coating the wire with the polyamide acid and curing in the same manner as described above. A set of four samples, i.e. a control sample and three zinc-treated samples of differing initial zinc deposition thickness, was subjected to 0%, 10%, 15%, and 20% elongation, respectively, before being heat-aged in an oven in air at 300° C. After varying heat-aging periods, the samples were removed from the oven, allowed to cool to room temperature and were tested for flexibility at room temperature by winding a portion of each sample on a mandrel having a diameter three times that of the wire. At the end of two hours at 300° C. all of the control samples failed the flexibility test, i.e. the polymer insulation was brittle and cracked which caused it to pull away and separate from the substrate. The zinc-treated samples showed no flaws in the insulation which was firmly bonded to the substrate. Even after heating for 120 hours at 300° C. insulation on the zinc-treated wire samples showed no flaws and remained firmly bonded to the substrate.

This example illustrates that no significant difference resulted in zinc-treated copper wire samples which differed in the initial zinc deposition thickness from 2 microinches to 10 microinches.

EXAMPLE 4

In this example, the effect of the zinc diffused in the copper on electrical conductivity was determined. Eight samples of zinc diffused copper wire and two control samples were prepared in the same manner as described in Example 3 insulated with the same polyimide. Each sample was heat-aged in an oven in air at 300° C., in some instances for 110 hours and in another instance for 287 hours, and the direct current conductivity of each sample was measured at 25° C. using a Wheatstone bridge and constant current supply. The reproducibility of these measurements, by the technique used, was ±0.5%. The results are shown in Table I. The percent conductivity is obtained by a comparison with the International Annealed Copper Standard (IACS) that has a conductivity of 100% or a resistivity of 1.7241 micro-ohm centimeters.

TABLE I.—ELECTRICAL CONDUCTIVITY MEASUREMENTS

| Sample No. | Zn thickness (microinches) | Time at 300° C. (hours) | Percent conductivity (IACS) |
|---|---|---|---|
| 1 | 2 | 110 | 100.8 |
| 2 | 2 | 110 | 101.0 |
| 3 | 5 | 110 | 101.6 |
| 4 | 5 | 110 | 100.8 |
| 5 | Control | 110 | 101.0 |
| 6 | 2 | 287 | 100.4 |
| 7 | 2 | 287 | 100.6 |
| 8 | 5 | 287 | 100.3 |
| 9 | 5 | 287 | 100.5 |
| 10 | Control | 287 | 100.9 |

Table I illustrates that there was no significant decrease in conductivity due to the presence of the zinc.

In addition, Samples 6, 7 and a control sample, all heat-aged for 287 hours at 300° C., were tested for flexibility at room temperature. The test comprised bending a portion of each sample and winding it on the remaining portion, i.e. the wire was wound around its own diameter. The control sample exhibited essentially complete loss of adhesion between the polymer coating and the copper wire. The insulation was brittle and cracked which caused it to pull away from the substrate. The zinc-treated wire samples, Sample Nos. 6 and 7, showed no flaws in the insulation which was still firmly bonded to the substrate.

EXAMPLE 5

An aromatic polysulfone-ether resin manufactured by Minnesota Mining and Manufacturing Company under the trademark of Polymer 360 was used to form the insulating coating in this example. This thermoplastic polymer had the following properties:

| | | ASTM test |
|---|---|---|
| Heat deflection (at 264 p.s.i.) | 525° F | D-648-56 [1] |
| Specific gravity | 1.36 | |
| Rockwell hardness | M110 | D-785 |
| Flammability | Self-extinguishing | D-635-56T |
| Tensile strength | 13,000 p.s.i | D-638 |
| Tensile modulus | 370,000 p.s.i | D-638 |

[1] In air circulating oven.

The polymer was dissolved in N-methyl-2-pyrrolidone to form a solution containing 12 percent solids. A coating of zinc was electroplated on the copper wire to give a film thickness of 2 microinches. The zinc-coated wire samples were hand dipped in the polymer solution and cured in an oven in air for one minute at 325° C. During this heating, the zinc diffused into the copper as evidenced by the fact that the surface (visible through the polymer coating) was a gold color of brass and did not show any of the silvery gray color of free zinc. This indicated that all of the zinc had diffused into the copper.

The dipping and curing process was repeated two more times to produce a total of three polymer dip coatings giving a final polymer coating thickness of 0.75 mil. Control copper wire samples were prepared by coating the copper wire with the same polymer and curing in the same manner as described above. All of the samples were heat-aged in an oven in air at a temperature of 250° C. and then tested for flexibility at room temperature in the manner as described in Example 4. At the end of 24 hours at 250° C., all of the control samples exhibited loss of adhesion between the polymer coating and the copper wire, and the polymer insulation was brittle and cracked causing it to pull away from the substrate. The zinc-treated wire samples showed no flaws in the insulation which was still firmly bonded to the substrate. Even after 200 hours at 250° C., none of the zinc-treated wire samples showed any flaws in the polymer insulation which remained firmly bonded to the substrate.

EXAMPLE 6

A polyesterimide resin prepared from the reaction in a suitable solvent of dimethyl terephthalate, trimellitic anhydride, methylene dianiline, tris-(2-hydroxy ethyl) isocyanurate and ethylene glycol (the preparation of which is described in British Pat. 1,082,181), in the form of a 21 percent solids solution in a solvent comprised of cresol and "Solvesso 100" was employed to coat a copper wire electroplated with zinc to a film thickness of 2 microinches. The zinc-coated copper wire samples were dip-coated in the polymer solution six times, each polymer coating being cured for one minute in an oven in air at 310° C. to give a final polymer film thickness of about 1.5 mils. Control copper wire samples coated with polymer in the same manner as described above were also prepared.

All of the samples were heat-aged in an oven in air at 240° C. and then tested at room temperature for flexibility in the same manner as described in Example 3. At the end of 48 hours at 240° C., the samples were tested for flexibility. All of the control samples failed the test, i.e. the polymer insulation was brittle and cracked which caused it to pull away and separate from the substrate. The zinc-treated samples showed no flaws in the insulation which was firmly bonded to the substrate. Even after heat-aging for 500 hours at 240° C., none of the insulation on the zinc-treated samples showed cracks and the insulation was still firmly bonded to the substrate.

2600 hours) were tested at room temperature for flexibility. Flexibility was determined by the effects on the polymer insulation by wrapping each sample around a mandrel having a diameter one times (1×), three times (3×) or five times (5×) that of the wire. Certain tests were made by first stretching the sample 15 percent before wrapping around the mandrel. The test results are shown in Table II.

TABLE II

| Sample No. | Base wire | Polymer and wire speed | Polymer coating thickness range (mils) High | Polymer coating thickness range (mils) Low | Heat-aged at 200° C. (hours) | Results |
|---|---|---|---|---|---|---|
| 11 | Control (copper) | Polyesterimide, 36′/min | 1.9 | 1.1 | 48 | Two turns on 1× mandrel peeled the polymer coating. |
| 12 | do | Polyester, 32′/min | 2.0 | 1.5 | 48 | A visible crack in polymer coating when wrapped around 1× mandrel. |
| 13 | do | Polyester, 36′/min | 1.7 | 1.5 | 48 | A 15% stretch and wrap around 3× mandrel visibly cracks polymer coating badly. |
| 14 | Zinc diffused copper | Polyesterimide, 36′/min | 1.9 | 1.0 | 1,600 | 15% stretch and wrap around 3× mandrel did not show any visible cracks in polymer coating. |
| | | | | | 2,600 | Polymer coating cracks when wound on 1× and 3× mandrels and coating peels off wire. No visible cracking on 5× mandrel wrap. |
| 15 | do | Polyester, 32′/min | 1.9 | 1.6 | 2,600 | Wrapped around 1× and 3× mandrel without any cracking or peeling off of the polymer coating. The bare wire color was a brass color and still very bright. |
| 16 | do | Polyester, 36′/min | 1.7 | 1.1 | 2,600 | Same as Sample No. 15. |
| 17 | Brass (70% Cu-30% Zn) plated copper. | Polyester | About 1.5 mils avg. | | 288 | Polymer coating peels off on 1× and 3× mandrel wrap. The plated bare wire was oxidized badly. |

EXAMPLE 7

In this example a continuous method of cleaning the copper wire and plating it with zinc was used. The apparatus was comprised of five juxtaposed compartments. The first compartment was a 20 inch long cleaning tank containing a cleaning solution formed by dissolving one pound of sodium cyanide per gallon of water. The second compartment provided a short spray water rinse. The third compartment was a 10 inch long electroplating tank containing the zinc electroplating solution. The fourth and fifth compartments were spray tap water and spray distilled water rinse compartments respectively. The wire was passed directly through the apparatus by means of O ring seals constructed of nylon and neoprene which could be adjustably compressed on the wire. Copper wire having a 0.0403 inch diameter was used. Several thousand feet of the copper wire, in continuous lengths greater than 1000 feet each, was cleaned and coated with zinc by being passed through the apparatus at a speed of 5 or 12 feet per minute with corresponding adjustment of the plating current to keep the zinc film thickness between 2 and 4 microinches. The zinc-coated wire was strand annealed by passage through a wire tower equipped with an induction annealing apparatus. The annealing was carried out so that the zinc completely diffused into the copper surface before the wire was exposed to annealing temperatures. There was no evidence of any significant vaporization of zinc during the annealing process. The surface of the annealed wire displayed again a gold color of brass, indicating the absence of free zinc.

Samples of the zinc-diffused wire were coated with a polyesterimide wire enamel similar to that described in Example 6. Additonal samples of the zinc-diffused wire were coated with a polyester wire enamel similar to that used in Example 2. Control samples were prepared by coating the clean copper wire with each of the polymers in the same manner. In addition to the control samples, an additional sample was prepared by electroplating the bare copper wire with brass (70% copper-30% zinc) to form a brass coating 4 microinches thick. All of the wire samples, except Sample 17, were coated with polymer and cured by passing them through an enameling tower at the speeds indicated in Table II. Sample 17 was coated with polymer by hand-dipping and cured by heating in an oven.

All of the samples were heat-aged in an oven in air at 200° C. for certain periods of time. At the end of each heat-aging period, the samples (a length of Sample 14 was tested after 1600 hours and a second length after As shown in Table II, the control samples, Sample Nos. 11–13 failed the flexibility tests after 48 hours of heat-aging whereas the zinc-diffused samples, Sample Nos. 14–16 were not affected after significantly longer heat-aging periods. In addition, Sample No. 17 shows that the good results of the present invention are not obtainable by plating the copper wire with brass.

At the end of 928 hours at 200° C., a length of Sample No. 14 was cut off and removed from the oven. Its polymer insulation was mechanically removed and portions of the exposed alloy surface layer were stripped off and examined by electron diffraction and by X-ray diffraction. The electron diffraction test showed that at the surface there was a layer of $\beta$-brass of 1000 Angstrom order of thickness. No evidence of an oxide was found. Beneath the 1000 Angstrom $\beta$-brass layer, X-ray diffraction using chromium radiation showed lines of copper with copper-zinc solid solution ($\alpha$-brass) to one side of the copper lines maximized at a lattice parameter of 3.628 Angstroms which corresponds to approximately 10% zinc. This indicated a concentration gradient of zinc in solid solution in the copper increasing toward the surface.

At the end of 288 hours at 200° C., the brass plated copper, i.e. Sample No. 17, was also examined by X-ray and electron diffraction in the same manner as above. Electron diffraction showed that the stripped-off layers of surface wire consisted of a mixture of pure copper and a lesser amount of zinc oxide and an unidentified compound. X-ray diffraction gave similar results.

EXAMPLE 8

In this example the copper wire was annealed before the zinc diffusion. Copper wire having a 0.040 inch diameter was used.

The annealing tower used an electric annealing system in which a high current was passed through the wire. When hot, the wire was in a steam atmosphere to prevent oxidation and produce some cleaning action at the surface.

The annealed wire was passed through the cleaning and plating apparatus described in Example 7. A zinc coating having a thickness ranging from about 2 to 4 microinches was deposited on the wire. For some samples of the zinc-coated wire, the zinc was diffused prior to the application of the polymer insulating coating, and for other samples, the zinc was diffused during cure of the first polymer coating. To diffuse the zinc before application of the polymer coating, the zinc-plated wire was centrally passed through a hot tube furnace at a rate which completely diffused the zinc into the copper surface to form a surface having the gold color of brass. The resulting zinc-diffused alloy surface was a gold color and did not show any of the silvery gray color of zinc which indicated the absence of free zinc.

ance test comprised ten samples. The figures in parenthesis indicate the number of remaining samples which have not failed the test at this point.

TABLE III

| Sample No. | Polymer and wire speed | Tests | Control (copper) | Zinc diffused into copper before polymer applied | Zinc diffused into copper during cure of first polymer coating |
|---|---|---|---|---|---|
| | | Thermal endurance (ASTM D-2307-64T) | | | |
| | | Hours to failure at— | | | |
| 18 | Polyesterimide, 7 ft./min | 280° C | 95 hrs | 281 hrs | 329 hrs. |
| 19 | do | 260° C | 772 hrs. (1) | 886 hrs. (5) | 983 hrs. (8) |
| 20 | do | 240° C | 1,543 hrs. (4) | 1,746 hrs. (10) | 1,746 hrs. (10) |
| | | Flexibility after heat-aging | | | |
| 21 | Polyesterimide, 7 ft./min | 100 hrs. at 180° C | Failed 1× but passed 3× mandrel. | Passed 1× mandrel | Passed 1× mandrel. |
| 22 | do | 200 hrs. at 180° C | Failed 1× but passed 2× mandrel. | do | Do. |
| | | Thermal endurance (ASTM D-2307-64T) | | | |
| | | Hours to failure at— | | | |
| 23 | Polyester, 9 ft./min | 280° C | 68 hrs | 357 hrs | |
| 24 | do | 260° C | 820 hrs. (2) | 1,014 hrs. (8) | |
| 25 | do | 240° C | 1,703 hrs. (6) | 1,746 hrs. (10) | |
| | | Flexibility after heat-aging | | | |
| 26 | Polyester, 9 ft./min | 100 hrs. at 180° C | Passed 1× mandrel | Passed 1× mandrel | |
| 27 | do | 200 hrs. at 180° C | Failed 1× but passed 2× mandrel. | do | |
| | | Thermal endurance (ASTM D-2307-64T) | | | |
| | | Hours to failure at— | | | |
| 28 | "Pyre-Ml," 6 ft./min | 320° C | 132 hrs | 326 hrs. (9) | |
| 29 | do | 300° C | 442 hrs | 1,143 hrs | |
| 30 | do | 280° C | 1,318 hrs. (10) | 1,318 hrs. (10) | |
| 31 | Polyimide A, 7 ft./min | 320° C | 72 hrs | 233 hrs | |
| 32 | do | 300° C | 415 hrs | 688 hrs | |
| 33 | do | 280° C | 1,445 hrs. (6) | 1,457 hrs. (8) | |

To diffuse the zinc during the cure of the first coating, the zinc-plated wire was passed through an enameling tower, i.e. a polymer coating and curing tower, where the wire was coated with polymer and the coating cured. Control samples were also prepared by passing the copper wire through the enameling tower in the same manner. All of the wire samples were polymer coated and cured by passing them through the enameling tower at the speeds indicated in Table III to produce 400 feet of polymer-coated wire for each set of conditions. Each wire sample was passed through the enameling tower 6 times to produce a final polymer coating having a thickness of about 1.5 mils.

Some of the wire samples were coated with the polyesterimide disclosed in Example 6. Additional samples were coated with a polyester wire enamel which was the same as that described in Example 2 with exception that tris-(2-hydroxy ethyl) isocyanurate was used in lieu of the glycerin. Other samples were coated with an N-methyl-2-pyrrolidone solution (17% solids) of a polyamide acid resin formed by the reaction of oxydianiline and pyromellitic dianhydride. This resin solution is sold by the Du Pont Company under the trademark "PYRE-M.L." When the polymer coating was cured, the polyamide acid was converted to the polyimide form.

Additional samples were coated with a polymer solution comprising a polyamide acid reaction product of 3,3',4,4'-benzophenone tetracarboxylic acid dianhydride and methylene dianiline dissolved in an organic solvent, such material being more particularly described in the aforementioned U.S. Pat. 3,277,043. During curing, the polyamide acid was converted to the polyimide and is referred to in Table III as Polyimide A.

All of the samples were heat-aged and tested as shown in Table III. The Flexibility after Heat-Aging Test in Table III was determined at room temperature by wrapping a sample around a mandrel having a diameter one times (1×), two times (2×) or three times (3×) that of the wire. The effects of this test on the polymer coating were determined with several visible cracks or peeling of the coating from the wire amounting to failure, and no visible cracking or loss of adhesion of the coating amounting to pasing. Eeach Sample No. for the Thermal Endurance test comprised ten samples.

As illustrated by Table III, the zinc-treated samples of the present invention could be heat-aged much longer than the control samples without degradation of the polymer coating insulation.

EXAMPLE 9

In this example, a copper foil was used having a thickness of 1.4 mils. The foil was cleaned in the same manner as the copper wire.

Four samples of the foil were electroplated with a zinc coating ranging from about 2 to 4 microinches in thickness. Two of the samples were heated in an oven for three minutes at 300° C. to diffuse the zinc into the copper surface. The surface of each zinc-diffused copper sample was a gold color of brass and did not show any of the silvery gray color of zinc, indicating the complete diffusion of the zinc.

A 20 percent polymer solids solution in N-methyl-2-pyrrolidone was used. The polymer was a polysiloxane-imide formed substantially as disclosed in Example 1 of U.S. Pat. No. 3,325,450, issued June 13, 1967. Specifically, the polymer was the polyamide reaction product of 1,3-bis-delta-aminobutyltetramethyldisiloxane and benzophenone dianhydride. The polymer solution was coated on one side of the zinc-treated samples as well as on two samples of clean copper foil used as controls. All of the polymer-coated samples were cured in an air oven for one hour at 100° C. and one hour at 200° C. The curing converted the polyamide to the polyimide with loss of water. The polymer film thickness after curing was about 0.5 mil. During the cure, the diffusion of the remaining two zinc-plated samples also occurred. In all four instances, the zinc-diffused copper surface was a gold color of brass indicating the complete absence of free zinc.

Three samples of the polymer-coated foil, i.e. one control and one of each type of zinc-diffused sample, were heated in an air oven at 300° C. for one hour and ten minutes. The remaining three samples were heated in the air oven at 250° C. for 18 hours. All of the heat-aged samples were tested for flexibility at room temperature by bending each sample foil 180 degrees, i.e. folding it, with the polymer coating on the outside of the bend and then bending the foil back to its original condition. The two control samples exhibited cracking at the bend and loss of adhesion of the polymer coating. The zinc-treated samples showed no visible cracks and the polymer coating remained firmly bonded to the foil.

EXAMPLE 10

This example illustrates the improved adhesive bond produced when a polymer is electrodeposited on the zinc-treated copper surface of the present invention as compared to the adhesive bond formed with a bare copper surface.

Twelve copper test specimens (per ASTM D897–47) were cleaned, coated, bonded and tested.

All samples were cleaned before zinc deposition in an 80–90° C. aqueous Oakite solution of 1 gm. Oakite and 10 gms. water to remove any oils or greases, and then rinsed thoroughly in hot tap water. They were then immersed in the acid cleaning solution for 30 seconds, then rinsed in cold water and wiped dry with a Kimwipe. Six of these samples were zinc plated at 0.39 ampere for 7 seconds to produce a zinc film having a thickness of about 5 microinches. They were then washed in tap water, rinsed in distilled water, and placed into a 250° C. oven for 5 minutes to diffuse the zinc into the copper.

The polymer was comprised of a polyamide acid reaction product of 3,3',4,4'-benzophenone tetracarboxylic acid dianhydride and 4,4'-methylene dianiline. Such polymers are described in U.S. Pat. No. 3,277,043. The polymer was dissolved in a solution of phenol and water. Sufficient ammonia was added to produce a final solution containing 10 percent solids, having a 5.95 pH and a 120 ohm cm. resistivity. The electrocoating procedure of this polymer is described in copending application of Fred F. Holub, U.S. Ser. No. 548,000, filed May 5, 1966 and assigned to the same assignee as in the present invention.

Each sample was polymer coated by immersing it in the polymer solution and electrocoating the polymer using a constant current of 5–6 ma./sq. inch with the sample as the anode and a stainless steel mesh screen as the cathode until a voltage of 15 volts was reached. The polymer coated specimen was then removed from the solution and placed immediately into an oven preheated to 150–180° C. and cured for 5–10 minutes at this temperature. This was followed by a final cure of 5 minutes at 250° C. Polymer film thickness of the cured samples was determined by using a Bausch and Lomb microscope (150× power) equipment with a micrometer dial. The procedure consisted of focusing first on the copper (through the clear film) and then on a dirt speck placed on the surface. By taking the difference in the readings on the micrometer gauge, the film thickness was determined.

The samples were mated to form lap joints substantially according to ASTM D897–47 and placed, three pairs per shot, into a preheated hydraulic press with the upper platen at 350° C. and the lower platen at 400° C. and pressed at 1,300 p.s.i. pressure until the samples reached 320° C. as indicated by a surface pyrometer. The heat was then turned off and a fan turned on to cool the samples, still under pressure. After the temperature reached less than 100° C., the pressure was released and the bonded samples were removed.

The bonded samples were then tested for bond strength by first allowing them to sit in an oven for 20 minutes at 200° C. and then pulling them on an Instrom tester at a temperature of 200° C. according to ASTM D897–47 except for the temperature. The "F" test cell and a pull speed of .05"/minute was used. The results are given in Table IV.

TABLE IV

| Sample No. | Sample substrate | Polymer film thickness before bonding (mils) | Calculated polymer bond line of bonded samples (mils) | P.s.i. at break of bonded samples | Type break |
|---|---|---|---|---|---|
| 34 | Untreated copper | .43/.63 | 1.06 | 110 | Adhesive. |
| 35 | Zinc diffused copper | .47/.83 | 1.30 | 560 | Do. |
| 36 | Untreated copper | .51/.55 | 1.06 | 38 | Do. |
| 37 | Zinc diffused copper | .39/.87 | 1.26 | 727 | Do. |
| 38 | Untreated copper | .67/.39 | 1.06 | 73 | Do. |
| 39 | Zinc diffused copper | .55/.63 | 1.18 | 945 | Adhesive-cohesive. |

Table IV illustrates that significantly better adhesive bond strengths are obtained when the polymer film is electrodeposited on a zinc diffused copper surface according to the present invention. Specifically, the average polymer bond strength, i.e. shear strength, produced with untreated copper was 74 p.s.i. as compared to the average polymer bond strength for the zinc diffused copper which was 744 p.s.i. This is of particular interest as a potential application for less expensive insulation in new motor and generator designs, as well as for increasing the strength of the machine by virtue of the superior polymer adhesion obtained.

There is also evidence in the literature that copper can catalyze the oxidation of carbon or graphite. This is particularly evident in the operation of motors and other electrical equipment where excessively rapid wear of carbon brushes occurs with copper commutators at temperatures of 100–120° C. and above. Since the trend is to operate such equipment to their maximum capability, thermal demands are steadily increasing but the carbon brushes are becoming a limiting factor.

Figure 3:
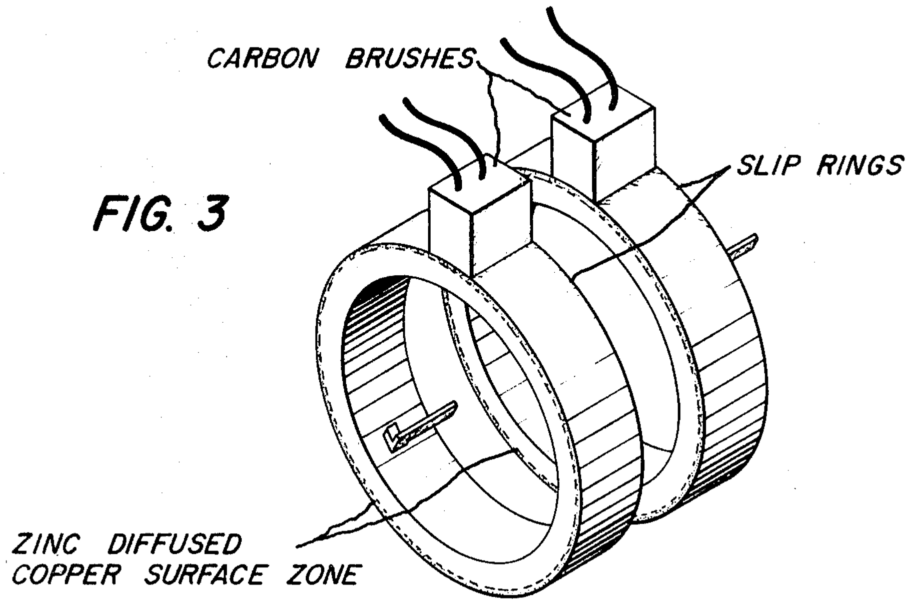
FIG. 3 illustrates slip rings having zinc diffused copper surface zones.
Figure 4:
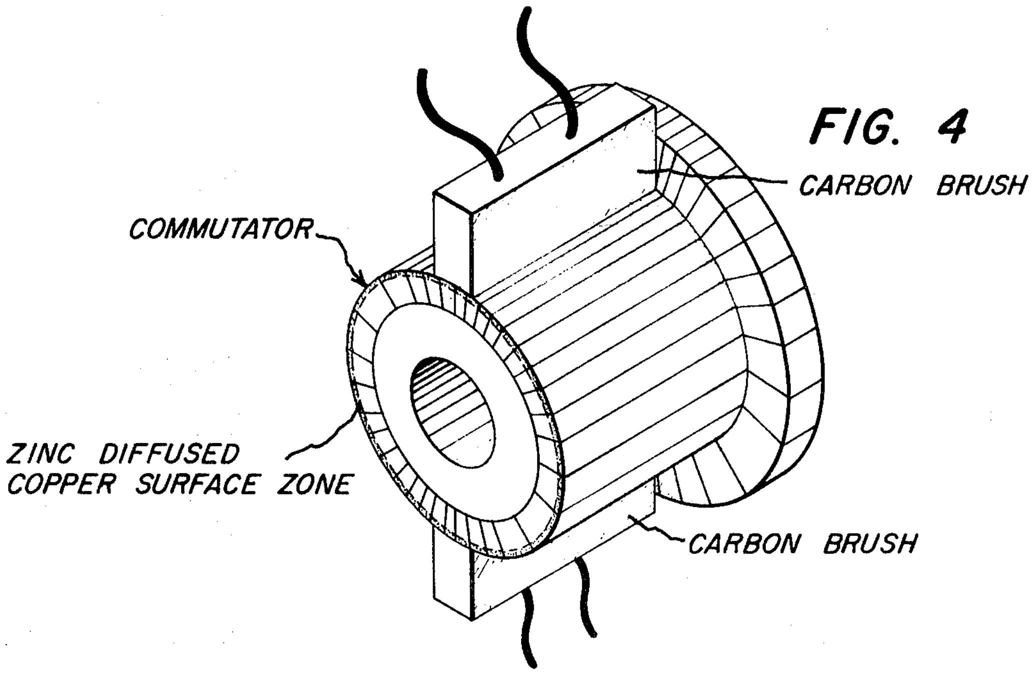
FIG. 4 illustrates a commutator having a zinc diffused copper surface zone.

The present invention is useful, therefore, to prevent wear of carbon brushes used with moving or sliding current collectors such as slip rings, commutators, and the like. Typical current collector structures are shown schematically in FIGS. 3 and 4. FIG. 3 shows copper slip rings, each having a zinc diffused copper surface zone, and carbon brushes mounted therein. FIG. 4 shows a simplified commutator structure having segments insulated one from the other in the usual fashion with a zinc diffused copper surface zone and carbon brushes mounted in sliding contact therewith.

EXAMPLE 11

A zinc film was electroplated on the surface of a copper commutator to a thickness of about 5 microinches. The commutator was then heated by means of a radio frequency induction coil until it was a gold color of brass and did not show any of the silvery gray color of zinc. This indicated that all of the zinc had diffused into the copper surface. This commutator was installed in a 1 horsepower D.C. motor which had two electrographitized carbon brushes. The motor was operated under a rated load of 7.8 amperes at 1150 r.p.m. for a total of 1500 hours being stopped at 100 hour intervals to determine brush wear. The average brush wear for 100 hours of operation was determined to be 1.5 mils. This rate of wear would permit the original brushes to last the entire life of the motor, about 40,000 hours, without replacement or maintenance. Normally, 4–5 brush changes would be necessary during this period.

As has been stated, the copper body of the present invention can be in any desired form. It is particularly useful in the abrasive field where copper coated abrasives, such as diamonds and cubic boron nitride sold under the trademark Borazon are embedded in a polymer matrix to form a grinding wheel. The copper coating functions to dissipate heat generated during the grinding process, to improve adhesion to the polymer and to retain any fractured diamond particles in the wheel until the cutting edges are dull. However, a number of polymers useful in forming grinding wheels, such as polyimides, are subject to copper catalyzed oxidative thermal degradation during the polymer curing cycle, as well as during actual grinding operations, causing the abrasives to be pulled away from the wheel prematurely. The present invention may be used to prevent such degradation by the copper. Specifically, a thin zinc film may be deposited on the copper coated abrasive and diffused therein. Alternatively, the zinc may be diffused into the copper coating at the elevated temperature required to cure the polymer.

In the present application, by copper is meant copper of various grades as well as copper containing alloys and mixtures which, because of their copper content, catalyze degradation of materials such as polymers, carbon or graphite when contacted with them.

It will be apparent to those skilled in the art that a number of variations are possible without departing from the scope of the invention. For example, the copper can be coated on another metal such as aluminum. In addition to the polymers described above, other polymers, many examples of which have been recited above, can be used to obtain the improved properties of the present invention. Also, the specific method for diffusing the zinc can be varied widely as well as the techniques by which the polymer is applied.

Although the utility of the product of the present invention has been described principally in terms of electrical applications, it should be understood that the product is useful in other applications where the polymer insulating the copper body may be subject to oxidation or degradation. The use of such polymeric compositions as bonding media for zinc-diffused copper surfaces to other metallic surfaces is not precluded.

Polymers particularly useful as bonding media are of the kind disclosed in U.S. Pats. 3,380,964 and 3,406,148. Specifically, U.S. Pat. 3,380,964 discloses reticulated polyimides produced by polymerizing a N,N'-bis-imide of an unsaturated dicarboxylic acid, preferably a maleic acid N,N'-bis-imide, such as, for example, N,N'-hexamethylene-bis-maleimide; N,N'-m-phenylene-bis-maleimide; N,N'-p-phenylene-bis-maleimide; and N,N'-p,p'-diphenylmethane-bis-maleimide. U.S. Pat. 3,406,148 discloses cross-linked polyimides produced by polymerizing a halogenated N,N'-bis-maleimide such as, for example, N,N'-(4-chloro - 1,3 - phenylene) bis-maleimide; N,N'-(2,5-dichloro-1,3-phenylene) bis-maleimide; N,N'-(3,3'-dichloro-4,4'-diphenylether) bis-maleimide; and N,N'-(3,3'-dichloro-4,4'-biphenylene) bis-maleimide.

What is claimed is:

1. A method of producing a polymer coated copper article comprising depositing a zinc coating having a thickness ranging from at least about one microinch to about 50 microinches on the surface of a copper body, providing a polymer coating on the deposited zinc coating, and heating said coated copper body below the melting point of zinc to diffuse substantially all of the zinc coating into the copper body to form a zinc diffused surface zone having the gold color of brass, the polymer coating being degradable by direct contact with copper in air, but not being adversely affected by said zinc diffusion process.

2. The method according to claim 1 wherein the zinc coating has a thickness of about 2 microinches to about 10 microinches.

3. The method of claim 2 wherein said copper body is in the form of a wire.

4. The method of claim 3 in which the polymer is electrodeposited on the said wire.

5. The method according to claim 1 wherein the polymer coating is formed from a polymer selected from the group consisting of polyimides, polyesters, polysulfoneethers and polyesterimides.

6. The method according to claim 5 wherein said polymer is a reticulated polyimide formed from a maleic acid N,N'-bis-imide.

7. The method according to claim 5 wherein said polymer is a cross-linked polyimide formed from a halogenated N,N'-bis-maleimide.

8. The method according to claim 5 wherein the polymer is a polyester which is the reaction product of dimethyl terephthalate, ethylene glycol, and glycerin.

9. The method according to claim 5 wherein the polymer is a polyester which is the reaction product of dimethyl terephthalate, ethylene glycol and tris-(2-hydroxy ethyl) isocyanurate.

10. The method according to claim 5 wherein the polymer is a polyimide formed from benzophenone dianhydride and m-phenylenediamine.

11. The method according to claim 5 wherein the polymer is the polyesterimide formed from dimethyl terephthalate, trimellitic anhydride, methylene dianiline, tris-(2-hydroxy ethyl) isocyanurate and ethylene glycol.

12. The method according to claim 5 wherein the polymer is a polyimide formed from oxydianiline and pyromellitic dianhydride.

13. The method according to claim 5 wherein the polymer is a polyimide formed from 1,3-bis-delta-aminobutyltetramethyldisiloxane and benzophenone dianhydride.

14. A method of treating a copper body to prevent it from degrading materials contacted therewith, which comprises depositing on the surface of the copper body a zinc coating having a thickness ranging from at least about one microinch to about 50 microinches, and thereafter heating said zinc coated body below the melting point of zinc to diffuse substantially all of the zinc into the copper body to form a zinc diffused surface zone having the gold color of brass, and providing a polymer coating on the surface of said zinc diffused surface zone, the polymer coating being degradable by direct contact with copper in air.

15. The method according to claim 1 wherein the polymer coating is formed from a polymer selected from the group consisting of polyimides, polyesters, polysulfoneethers and polyesterimides.

16. The method according to claim 15 wherein said polymer is a reticulated polyimide formed from a maleic acid N,N'-bis-imide.

17. The method according to claim 15 wherein said polymer is a cross-linked polyimide formed from a halogenated N,N'-bis-maleimide.

18. The method according to claim 15 wherein the polymer is a polyester which is the reaction product of dimethyl terephthalate, ethylene glycol, and glycerin.

19. The method according to claim 15 wherein the polymer is a polyester which is the reaction product of dimethyl terephthalate, ethylene glycol and tris-(2-hydroxy ethyl) isocyanurate.

20. The method according to claim 15 wherein the polymer is a polyimide formed from benzophenone dianhydride and m-phenylenediamine.

21. The method according to claim 15 wherein the polymer is the polyesterimide formed from dimethyl terephthalate, trimellitic anhydride, methylene dianiline, tris-(2-hydroxy ethyl) isocyanurate and ethylene glycol.

22. The method according to claim 15 wherein the polymer is a polyimide formed from oxydianiline and pyromellitic dianhydride.

23. The method according to claim 15 wherein the polymer is a polyimide formed from 1,3-bis-delta-amino-butyltetramethyldisiloxane and benzophenone dianhydride.

References Cited

UNITED STATES PATENTS

| | | | |
|---|---|---|---|
| 2,497,119 | 2/1950 | Fink | 117—131 |
| 2,898,227 | 8/1959 | Drummond | 117—130X |
| 3,105,775 | 10/1963 | Lavin et al. | 117—75X |
| 3,120,447 | 2/1964 | Buckle | 117—131X |
| 3,168,417 | 2/1965 | Smith, Jr. et al. | 117—218X |
| 3,190,770 | 6/1965 | Lavin et al. | 117—75X |
| 3,201,276 | 8/1965 | Meyer et al. | 117—218 |
| 3,278,331 | 10/1966 | Taylor et al. | 117—107.1 |
| 3,309,334 | 3/1967 | Holub | 117—75X |
| 3,390,118 | 6/1968 | Bach et al. | 117—75X |
| 3,425,866 | 2/1969 | Meyer et al. | 117—218 |
| 3,451,848 | 6/1969 | Stephens | 117—218 |

ALFRED L. LEAVITT, Primary Examiner

C. K. WEIFFENBACH, Assistant Examiner

U.S. Cl. X.R.

117—218, 232, 71, 75